United States Patent
Nakamura et al.

(10) Patent No.: US 8,619,159 B2
(45) Date of Patent: Dec. 31, 2013

(54) IMAGING DEVICE, IMAGE STORING METHOD, AND RECORDING MEDIUM FOR PROCESSING IMAGE CAPTURING LOCATION INFORMATION

(75) Inventors: Kenji Nakamura, Osaka (JP); Munehiro Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 233 days.

(21) Appl. No.: 13/081,057

(22) Filed: Apr. 6, 2011

(65) Prior Publication Data
US 2011/0267496 A1 Nov. 3, 2011

(30) Foreign Application Priority Data
Apr. 28, 2010 (JP) .................................. 2010-102987

(51) Int. Cl.
*H04N 5/76* (2006.01)
(52) U.S. Cl.
USPC .................. 348/231.7; 348/231.3; 348/231.5; 348/231.6; 348/231.99
(58) Field of Classification Search
USPC .......... 348/231.7, 231.3, 231.5, 231.6, 231.99
See application file for complete search history.

(56) References Cited

U.S. PATENT DOCUMENTS

| | | | |
|---|---|---|---|
| 6,553,492 B1 * | 4/2003 | Hosoe ............................ | 713/153 |
| 2006/0117010 A1 * | 6/2006 | Hakala ............................... | 707/9 |
| 2007/0242827 A1 * | 10/2007 | Prafullchandra et al. ..... | 380/241 |
| 2009/0037993 A1 * | 2/2009 | Ano et al. .......................... | 726/7 |
| 2009/0322904 A1 * | 12/2009 | Takahashi ................... | 348/231.3 |
| 2010/0053372 A1 * | 3/2010 | Shimizu et al. ............ | 348/231.3 |

FOREIGN PATENT DOCUMENTS

| | | |
|---|---|---|
| JP | 11-23308 | 1/1999 |
| JP | 2003-242041 | 8/2003 |
| JP | 2009-225229 | 10/2009 |
| JP | 2010-62903 | 3/2010 |

* cited by examiner

*Primary Examiner* — Antoinette Spinks
(74) *Attorney, Agent, or Firm* — Oblon, Spivak, McClelland, Maier & Neustadt, L.L.P.

(57) ABSTRACT

An imaging device for capturing an image of a subject to acquire captured-image information, comprises: a positioning element arranged to measure a location at which the image is captured, to acquire capturing location information indicating a capturing location when the captured-image is acquired; a creation element arranged to create image information based on the capturing location information acquired by the positioning element and the captured-image information; a memory element arranged to store the image information created by the creation element; a decision element arranged to, when the image information stored in the memory element is output to the outside, decide whether or not the capturing location information included in the image information is to be kept secret; and a fabricator element arranged to fabricate the capturing location information included in the image information in accordance with a result of the decision by the decision element. Thus, it is possible to prevent leaking of information on the capturing location that is a kind of private information, minimizing reduction of convenience and versatility of the image information including the information on the capturing location.

19 Claims, 8 Drawing Sheets

IMAGING DEVICE, IMAGE STORING METHOD, AND RECORDING MEDIUM FOR PROCESSING IMAGE CAPTURING LOCATION INFORMATION

BACKGROUND OF THE INVENTION

1. Field of the Invention

The present invention relates to a technique for processing image information which includes information related to a capturing location.

2. Description of the Related Art

There are proposed techniques for adding information related to a capturing location to image information obtained by an imaging device having a GPS function such as a digital camera. The image information with the information on the capturing location can be used for various applications using the capturing location. This usage of the image information draws attention as a new way to have fun with the image information.

On the other hand, images taken by individuals are often put on or posted in Internet websites, blogs or the like to be open to the public. At the same time, the capturing location may be also open to the public, although it is private information that should not be leaked to the public in some cases (e.g., in a case where the capturing location reveals the address). Therefore, a technique is described in JP-A-2009-225229, for example, which can prevent leaking of the information on the capturing location added to the image information by encrypting the information on the capturing location and the like.

JP-A-2009-225229 describes that the information on the capturing location and the like is encrypted based on the capturing condition and is then stored. However, the technique has problems that the capturing condition is not clear and that the status of the image information is fixed at the time of image capturing. For example, the same image information may be put in a private album in a privately-used personal computer and be also open to public by being put in an Internet website or blog. Therefore, in case of using the image information in different ways as described above, if it is determined whether or not the information is to be encrypted based on the capturing condition at the time of image capturing, convenience may be reduced.

Moreover, "encryption" is one of effective ways of preventing leaking of information, but there still remains the possibility that the encrypted information can be analyzed, that is, there remains risk of leaking of the contents. Therefore, even the encrypted information should not be added in some usages of the image information. However, this cannot be predicted or determined at the time of image capturing. Also, even if determination on the encryption is made at the time of image capturing, that determination may be wanted to be changed later or may be forgotten so that the information is open to public by mistake.

Moreover, the image information created with a digital camera is transferred to an external device, e.g., a personal computer, and is then made viewable, for example, in many cases. In those cases, the image information encrypted in the digital camera requires a dedicated decryption program provided in the device to which the encrypted image information is transferred. This lowers versatility of the image information.

SUMMARY OF THE INVENTION

It is an object of the present invention to provide techniques which can minimize reduction of convenience and versatility of using image information including information on a capturing location and which can prevent leaking of the information on the capturing location that is a kind of private information.

Thus, the present invention is directed to an imaging device which can capture an image of a subject to acquire captured-image information.

According to an aspect of the present invention, the imaging device comprises: a positioning element arranged to measure a location at which the image is captured, to acquire capturing location information indicating a capturing location when the captured-image is acquired; a creation element arranged to create image information based on the capturing location information acquired by the positioning element and the captured-image information; a memory element arranged to store the image information created by the creation element; a decision element arranged to, when the image information stored in the memory element is output to the outside, decide whether or not the capturing location information included in the image information is to be kept secret; and a fabricator element arranged to fabricate the capturing location information included in the image information in accordance with a result of the decision by the decision element.

According to another aspect of the present invention, the imaging device comprises: a positioning element arranged to measure a location at which the image is captured, to acquire capturing location information indicating a capturing location when the captured-image is acquired; a memory element arranged to store reference location information on a reference location; a decision element arranged to, when the image is captured, decide whether or not the capturing location information acquired by the positioning element is to be kept secret in accordance with a result of comparison of the capturing location information and the reference location information stored in the memory element to each other; and a creation element arranged to create image information based on a result of the decision by the decision element and the captured-image information.

The present invention is also directed to an image storing method.

According to an aspect of the present invention, the image storing method comprises the steps of: capturing an image of a subject with an imaging device to acquire captured-image information; acquiring capturing location information indicating a capturing location at which the image is captured, by a positioning element when the captured-image information is acquired; creating image information based on the capturing location information and the captured-image information; storing the image information in a memory element of the imaging device; when the image information stored in the memory element is output from the imaging device to the outside, deciding whether or not the capturing location information included in the image information is to be kept secret; fabricating the capturing location information included in the image information in accordance with the decision; and storing the image information thus fabricated.

According to another aspect of the present invention, the image storing method comprises the steps of: storing reference location information on a reference location in a memory element; capturing an image of a subject with an imaging device to acquire captured-image information; acquiring capturing location information indicating a capturing location at which the captured-image information is acquired, by a positioning element when the captured-image information is acquired; deciding whether or not the capturing location information is to be kept secret in accordance with a result of comparison of the capturing location information and the reference location information stored in the memory element to each other; creating image information based on the decision and the captured-image information; and storing the image information in the memory element.

Moreover, the present invention is directed to a recording medium storing a computer readable program.

According to an aspect of the present invention, when executed, the program stored in the recording medium causes the computer to work as an imaging device that comprises: an image capturing element arranged to capture an image of a subject to acquire captured-image information; a positioning element arranged to measure a location at which the image is captured, to acquire capturing location information indicating a capturing location when the captured-image is acquired; a creation element arranged to create image information based on the capturing location information acquired by the positioning element and the captured-image information; a memory element arranged to store the image information created by the creation element; a decision element arranged to, when the image information stored in the memory element is output to the outside, decide whether or not the capturing location information included in the image information is to be kept secret; and a fabricator element arranged to fabricate the capturing location information included in the image information in accordance with a result of the decision by the decision element.

According to another aspect of the present invention, when executed, the program stored in the recording medium causes the computer to work as an imaging device that comprises: an image capturing element arranged to capture an image of a subject to acquire captured-image information; a positioning element arranged to measure a location at which the image is captured, to acquire capturing location information indicating a capturing location when the captured-image is acquired; a memory element arranged to store reference location information indicating a reference location; a decision element arranged to, when the image is captured, decide whether or not the capturing location information acquired by the positioning element is to be kept secret in accordance with a result of comparison of the capturing location information and the reference location information stored in the memory element to each other; and a creation element arranged to create image information based on a result of the decision by the decision element and the captured-image information.

These and other objects, features, aspects and advantages of the present invention will become more apparent from the following detailed description of the present invention when taken in conjunction with the accompanying drawings.

DETAILED DESCRIPTION OF PREFERRED EMBODIMENTS

Figure 1:
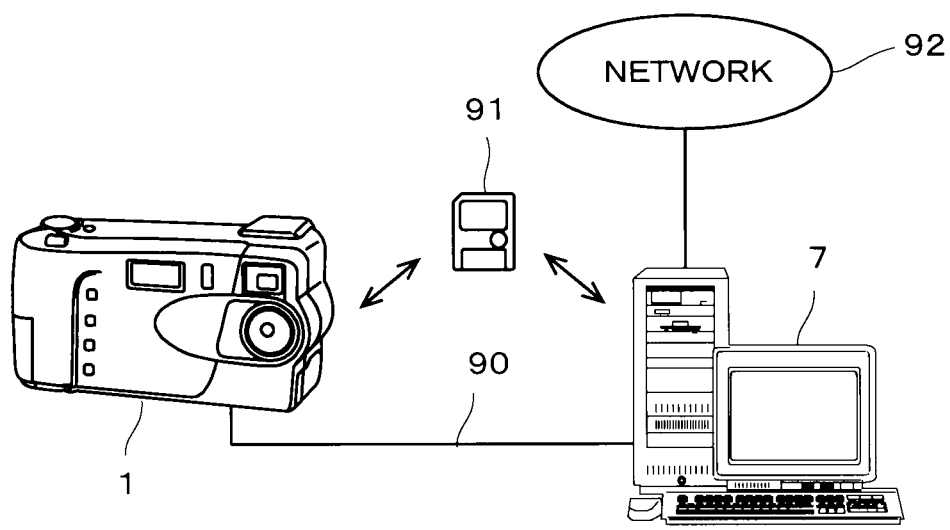
FIG. 1 is a configuration view of an image viewer system including a digital camera as an imaging device according to the present invention.

FIG. 1 shows the configuration of an image viewer system 9 including a digital camera 1 as an imaging device according to the present invention. The image viewer system 9 includes the digital camera 1 and a viewer device 7 and is arranged as a system in which image information (described later) created by the digital camera 1 can be viewed with the viewer device 7.

Referring to FIG. 1, the digital camera 1 is arranged to be connected to the viewer device 7 via a detachable cable 90, e.g., a USB cable. Thus, while the digital camera 1 is connected to the viewer device 7 via the cable 90, data can be communicated between the digital camera 1 and the viewer device 7. Information transfer between the digital camera 1 and the viewer device 7 can be also carried out via a detachable portable storage medium 91. Data communication between the digital camera 1 and the viewer device 7 may be wireless communication, e.g., Wi-Fi communication, although it is not shown in FIG. 1.

The digital camera 1 is also arranged as a portable imaging device. Therefore, a user can remove the cable 90, bring the digital camera 1 with the user to a desired place, and capture an image of a subject at a desired location.

The viewer device 7 is a general personal computer, for example, and is connected to a wide area network (network 92) such as the Internet. Thus, the viewer device 7 can make various contents (e.g., images taken with the digital camera 1) open to the public and viewable by putting them in or posting them on an Internet website or blog, for example. Moreover, the viewer device 7 can be used (viewed) by a user privately. That is, the viewer device 7 contains both information to be open to the public and private information which should not be open to the public. It is therefore necessary to manage the above two types of information in an appropriate way without mixing them with each other.

The viewer device 7 in the image viewer system 9 is also arranged to share the storage medium 91 with the digital camera 1.

Figure 2:
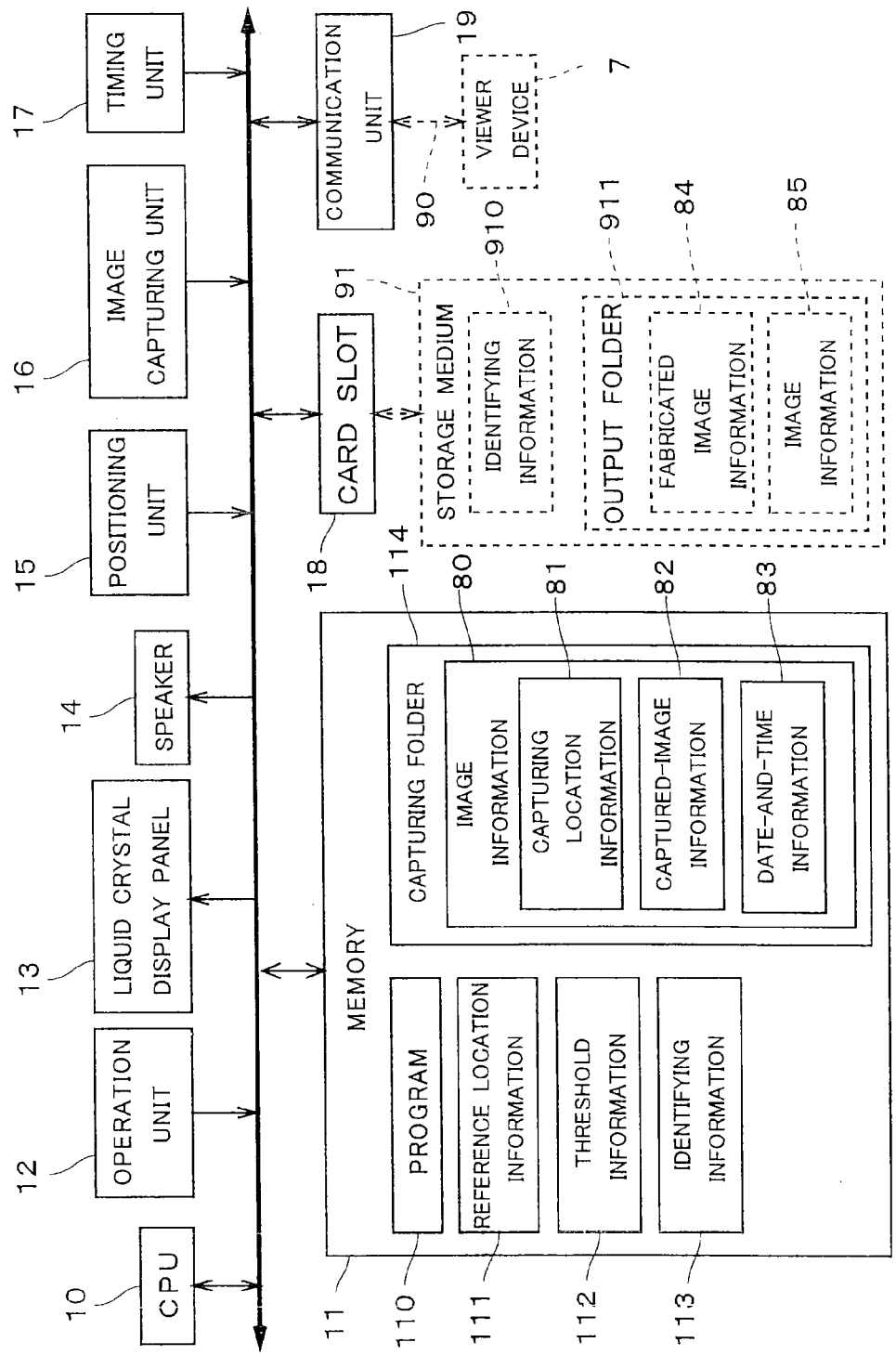
FIG. 2 shows an exemplary configuration of the digital camera.

FIG. 2 shows an exemplary configuration of the digital camera 1. The digital camera 1 includes a CPU 10, a memory 11, an operation unit 12, a liquid crystal display panel (hereinafter, simply referred to as an LCD panel) 13, and a speaker 14, and has the configuration and functions as a general computer.

The CPU 10 operates in accordance with a program 110 stored in the memory 11 to execute various processing operations and control the components of the digital camera 1. In other words, the digital camera 1 as a kind of computer executes the program 110 by its CPU 10, thereby making various functions of the digital camera 1 in the first preferred embodiment work. The operation of the CPU 10 will be described later.

The memory 11 stores the program 110 to be executed by the CPU 10 and various types of information including reference location information 111, threshold information 112, and identifying information 113, for example. The reference location information 111 is information on a location set as the reference (hereinafter, referred to as a reference location), e.g., the location of a user's home. The threshold information 112 is information indicating a threshold of a relative distance which is used for decision whether or not to keep the image information 80 secret. The identifying information 113 is information used for identifying a storage medium 91 which is mounted on the digital camera 1 to store the image information 80 to be kept secret. The details of those kinds of information will be described later.

In FIG. 2, the memory 11 is shown as one unit for the sake of convenience. In actual, however, the memory 11 is made up of various hardware components depending on intended use, e.g., a read-only ROM, a volatile RAM which can be used as a temporary working area of the CPU 10, or a non-volatile memory device which is readable and writable.

As shown in FIG. 2, a capturing folder 114 for storing image information 80 is created in the memory 11 in the first preferred embodiment of the present invention. The image information 80 includes captured-image information 82 acquired by an image capturing unit 16, capturing location information 81 acquired by a positioning unit 15 when the captured-image information 82 is acquired, i.e., when an image is taken, and date-and-time information 83 acquired by a timing unit 17 when the captured-image information 82 is acquired. Those three types of information are associated with one another in the image information 80.

In the digital camera 1 thus configured, the capturing location and the capturing time and date of the captured-image information 82 included in the image information 80 can be represented based on the capturing location information 81 and the date-and-time information 83 associated with the captured-image information 82. The capturing folder 114 for storing the image information 80 may be created in the storage medium 91. As a specification for the image file format used for creating the image information 80 to include the capturing location information 81, Exif (Exchangeable Image File) can be used, for example.

The operation unit 12 is arranged as various buttons and keys and can receive instruction information on the user's instruction to the digital camera 1. Examples of the operation unit 12 include a shutter button which instructs the digital camera 1 to capture an image, an eject button which instructs the digital camera 1 to remove the storage medium 91, a power button, at least one key which enables the user to input various conditions of image capturing, instructions related to file operation, and the like.

The LCD PANEL 13 can display various kinds of information on its screen, thereby outputting and presenting the information to the user. Especially, the LCD PANEL 13 in the first preferred embodiment can display notification information which will be described later. That is, the LCD PANEL 13 is an example of an output element according to the present invention.

The speaker 14 can notify the user of various statuses by outputting sounds corresponding to the respective statuses. In the digital camera 1 of the first preferred embodiment, the notification information described later is output only by the LCD PANEL 13. However, the notification information may be output as sound by the speaker 14. In other words, the speaker 14 may be used as the output element according to the present invention.

As shown in FIG. 2, the digital camera 1 also includes the positioning unit 15, the image capturing unit 16, the timing unit 17, a card slot 18, and a communication unit 19.

The positioning unit 15 has a function of measuring the location of the digital camera 1 at a predetermined time (which may be indicated by a control signal from the CPU 10) to acquire information on the location. Especially, the positioning unit 15 is arranged to measure the location of the digital camera 1 when the image capturing unit 16 described later captures an image to acquire capturing location information 81. In other words, the positioning unit 15 works with operation of the operation unit 12 (i.e., pressing the shutter button) to acquire the capturing location information 81 which indicates the capturing location at which the digital camera 1 captures an image.

The positioning unit 15 in the first preferred embodiment is arranged to have a general GPS function. However, the measurement method of the positioning unit 15 is not limited to the measurement using the GPS function, but can be any method as long as it can measure the location of the digital camera 1. In a case where the digital camera 1 has a wireless LAN function, for example, the location may be measured with the positioning function using the wireless LAN or both the wireless LAN and GPS. Moreover, the positioning unit 15 may be arranged to acquire information on the orientation (capturing direction) in addition to the location and include the capturing direction thus acquired into the capturing location information 81.

The image capturing unit 16 is arranged to include an optical device (not shown) such as a lens and a photoelectric conversion device (not shown) such as a CCD, and has a function of capturing an image of a subject in response to the operation of the operation unit 12 (shutter button) to acquire captured-image information 82.

The timing unit 17 is arranged to store date and time and has a function of acquiring date-and-time information 83 which indicates the date and time when the image capturing unit 16 acquires the captured-image information 82. That is, the timing unit 17 works with the operation of the operation unit 12 (shutter button) to acquire the date-and-time information 83. The thus acquired date-and-time information 83 indicates the capturing date and time of the captured-image information 82.

The card slot 18 has a function of accommodating the storage medium 91 to be removable. This enables to the CPU 10 to store various kinds of information in the storage medium 91 inserted in the card slot 18 and to read out various kinds of information stored in the storage medium 91. The card slot 18 may be arranged to accommodate a plurality of storage media 91.

The storage medium 91 is a portable non-volatile storage medium, e.g., an SD card or a CF card. The storage medium 91 can be mounted not only on the card slot 18 of the digital camera 1, but also on the viewer device 7. The storage medium 91 in the first preferred embodiment also has pre-stored identifying information 910 for identifying an individual storage medium 91.

As shown in FIG. 2, an output folder 911 is created in the storage medium 91 for storing fabricated image information 84 and image information 85. The fabricated image information 84 is created by fabricating the image information 80 (mainly capturing location information 81) by the CPU 10. The image information 85 is the image information 80 with the raw capturing location information 81 which is copied from the capturing folder 114 into the output folder 911 because the CPU 10 decides that the capturing location information 81 need not be kept secret. The details of those kinds of information will be described later.

The communication unit 19 constitutes a connector into which an end of a cable 90 can be inserted, and provides a function of carrying out data communication between the digital camera 1 and the viewer device 7 via the cable 90. In a case where wireless communication is carried out between the digital camera 1 and the viewer device 7 via wireless LAN, wireless WAN or wireless MAN, for example, the communication unit 19 provides a function of enabling wireless communication.

Figure 3:
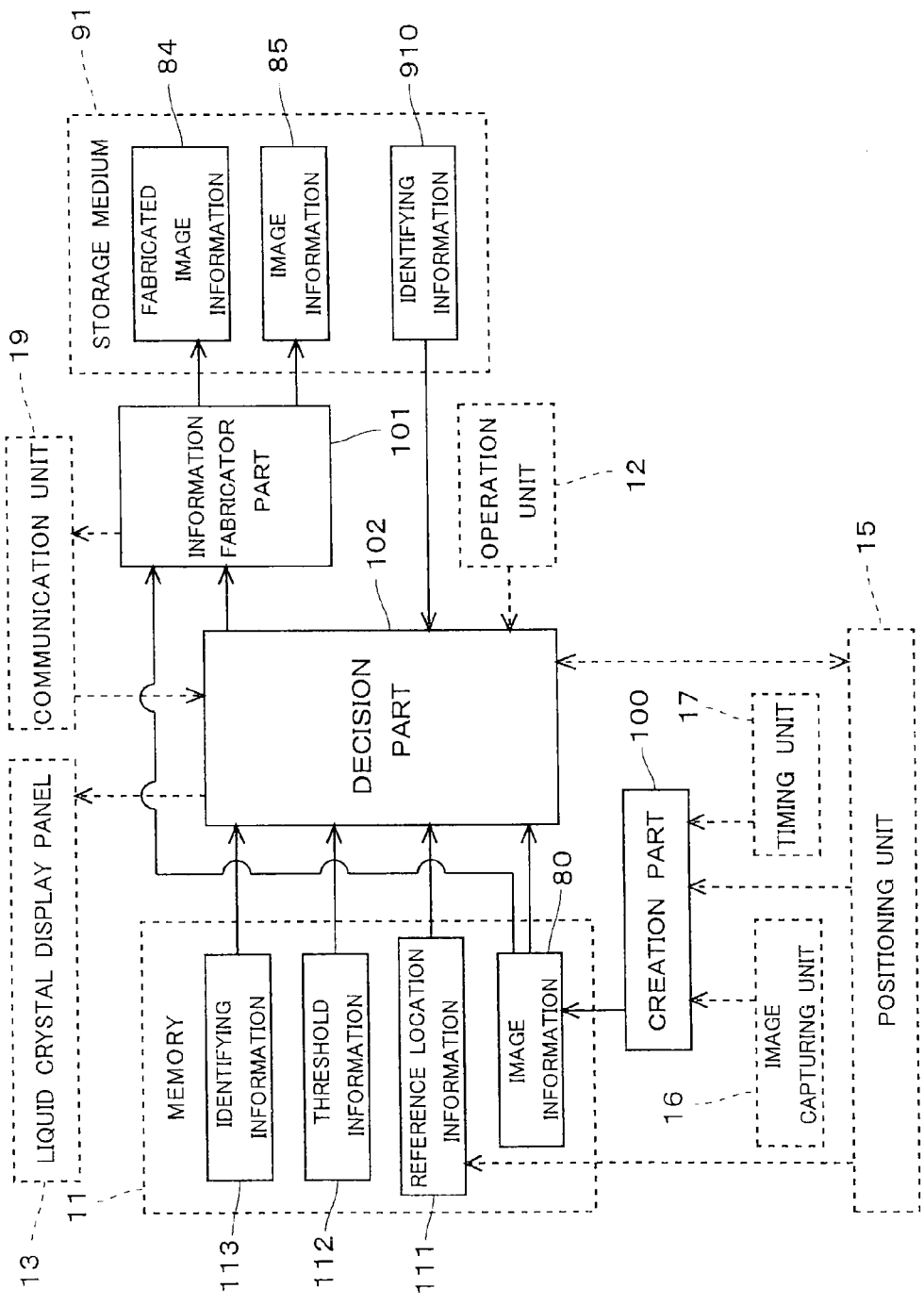
FIG. 3 is a block diagram showing functional blocks of the digital camera with data flows.

FIG. 3 shows the functional blocks of the digital camera 1 and the data flow therein. A creation part 100, an information fabricator part 101, and a decision part 102 shown in FIG. 3 are functional blocks implemented by the operation of the CPU 10 working in accordance with the program 110.

When captured-image information 82 is acquired by the image capturing unit 16, the creation part 100 acquires, from the positioning unit 15, capturing location information 81 (which indicates a capturing location) acquired by the positioning unit 15 and creates image information 80 based on the capturing location information 81 thus acquired and the captured-image information 82. Also, the creation part 100 adds date-and-time information 83 acquired by the timing unit 17 to the image information 80, when creating the image information 80 based on the captured-image information 82.

That is, the creation part 100 has a function of creating image information 80 based on captured-image information 82 acquired by image capturing and the capturing location information 81 and date-and-time information 83 both acquired in conjunction with the image capturing. The thus created image information 80 is stored in the memory 11 (the capturing folder 114).

The information fabricator part 101 creates fabricated image information 84 in accordance with the result of decision (more specifically, the result of final decision) transferred from the decision part 102, at a time of the transfer of the decision result. More specifically, the information fabricator part 101 fabricates the capturing location information 81 (which indicates the capturing location) included in the image information 80 stored in the capturing folder 114, thereby creating the fabricated image information 84.

In the first preferred embodiment, the information fabricator part 101 deletes the capturing location information 81 from the image information 80, thereby fabricating the image information 80 into the fabricated image information 84. Thus, even if the fabricated image information 84, which does not have the capturing location information 81, is made open, the capturing location (capturing location information 81) cannot be leaked and therefore leaking of private information can be surely prevented.

The information fabricator part 101 may fabricate the image information 80 into the fabricated image information 84 by replacing the capturing location information 81 included in the image information 80 with dummy data (pseudo information). The fabricated image information 84 including the dummy data only cannot expose the capturing location (capturing location information 81). Therefore, it is possible to surely prevent leaking of private information. Moreover, the information fabricator part 101 may encrypt the capturing location information 81 included in the image information 80, thereby fabricating the image information 80 into the fabricated image information 84. Also, the information fabricator part 101 may move the capturing location information 81 into a vendor unique area of the fabricated image information 84 or the like and store it therein. Furthermore, the user may choose at least one of the aforementioned fabricating methods in an appropriate manner.

In a case where the decision result transferred from the decision part 102 indicates that any fabricating of the capturing location information 81 in the image information 80 is not needed, the information fabricator part 101 reads that image information 80 from the capturing folder 114, and outputs the read image information 80 as image information 85.

The fabricated image information 84 and the image information 85 from the information fabricator part 101 are output to a destination specified as the output destination of the image information 80 and are then stored therein. In the first preferred embodiment, the output destination of the image information 80 is the output folder 911 (shown in FIG. 2) in the storage medium 91 or the external device (e.g., the viewer device 7 shown in FIG. 1) connected to the digital camera 1 via the communication unit 19.

The information fabricator part 101 in the first preferred embodiment does not delete the image information 80 which has been converted into the fabricated image information 84 from the capturing folder 114. In other words, even after the capturing location information 81 of the image information 80 is fabricated and the fabricated image information 84 is output, the "original" image information 80 (i.e., the image information 80 with the raw capturing location information 81) is left and stored in the capturing folder 114. Therefore, the user can use the image information 80 with the raw capturing location information 81 even after the fabricated image information 84 is created.

On the other hand, the image information 85 is the same as the "original" image information 80. Thus, the "original" image information 80 from which the image information 85 has been obtained is deleted from the capturing folder 114 for efficiently using the storage capacity of the memory 11. Alternatively, all files of the image information 80 may be left and saved unless the user instructs to delete.

Moreover, for the "original" image information 80 from which the fabricated image information 84 has been created, the captured-image information 82 included in the "original" image information 80 may be deleted for preventing the increase in the information amount, while the link between the image information 80 and the fabricated image information 84 is kept. In other words, for the image information 80 which has been converted into the fabricated image information 84, only the capturing location information 81 and the date-and-time information 83 may be left in the capturing folder 114.

The decision part 102 is arranged to decide whether or not the capturing location information 81 included in the image information 80 is to be kept secret in accordance with various decision conditions, when that image information 80 is output to the outside. The result of the final decision by the decision part 102 is transferred to the information fabricator part 101. The conditions used for decision by the decision part 102 of whether or not to keep the capturing location information 81 secret in the first preferred embodiment will be described in detail later.

The decision part 102 in the first preferred embodiment regards a time at which the communication unit 19 connects the digital camera 1 to the external device (e.g., the viewer device 7) such that data can be communicated therebetween as a time of output of the image information 80 to the outside, and decides whether or not the capturing location information 81 in that image information 80 is to be kept secret. This is because, when the communication line is connected in the digital camera 1, it is highly likely that the image information 80 is output to the outside. More specifically, the decision part 102 detects that the cable 90 is connected to the communication unit 19 of the digital camera 1 and decides at the detected time whether or not to keep the capturing location information 81 secret.

Alternatively, the decision part 102 may regard a time at which a request for outputting the image information 80 is received from the external device connected to the digital camera 1 via the communication unit 19 as the time of output of the image information 80 to the outside. In a case where the communication unit 19 carries out wireless communication, the decision part 102 may regard a time of establishment of link between the communication unit 19 and the the external device as the time of output of the image information 80 to the outside.

Also, the decision part 102 is arranged to decide whether or not the capturing location information 81 in the image information 80 is to be kept secret, regarding a time at which the image information 80 stored in the capturing folder 114 is transferred to the output folder 911 as the time of output of the image information 80 to the outside. This is because the storage medium 91 which can be removed at a given time can be regarded as an external device of the digital camera 1 and therefore the data transfer from the memory 11 to the storage medium 91 can be regarded as data output to the external device.

As an exemplary case where the image information 80 stored in the capturing folder 114 is transferred to the output folder 911, a case is considered in which transfer of the image information 80 stored in the capturing folder 114 to the output folder 911 is instructed through the operation of the operation unit 12. Moreover, the CPU 10 may be arranged to transfer the image information 80 in the capturing folder 114 to the output folder 911 automatically (or with user's permission), when the available amount of space of the memory 11 is less than a predetermined amount, for example. Also in this case, the decision part 102 decides whether or not the capturing location information 81 is to be kept secret.

As described above, in the present preferred embodiment, the image information 80 is stored in the capturing folder 114 created in the memory 11 and therefore cannot be taken out of the digital camera 1 even if the storage medium 91 is removed. However, the digital camera 1 can be arranged to store the image information 80 in the storage medium 91, as described above. In this case, the decision part 102 may regard a time at which removal of the storage medium 91 is instructed through the operation of the operation unit 12 as the time of output of the image information 80 to the outside and decide whether or not the capturing location information 81 is to be kept secret.

Moreover, it can be highly probable that the user who instructs removal of the storage medium 91 has intention to take the image information 80 out to the outside. Therefore, the digital camera 1 may be arranged to automatically start outputting (transferring) the image information 80 stored in the capturing folder 114 to the output folder 911 at a time at which removal of the storage medium 91 is instructed. In this case, prior to output of the image information 80, the decision part 102 decides whether or not to keep the capturing information 81 secret for determining whether the image information 80 is output as the fabricated image information 84 or as the image information 85.

On the other hand, the capturing folder 114 can be created in the storage medium 91, not in the memory 11, as described above. However, a removable storage medium (storage medium 91) is generally removed by the operation of an eject button which can generally work even while the power of the main body of the device is off. Therefore, in a case where the capturing folder 114 is created in the storage medium 91, the decision part 102 cannot make the decision while the power of the digital camera 1 is off. Also, the processing by the information fabricator part 101 cannot be carried out. Thus, removal of the storage medium 91 in such a situation is not preferable.

One exemplary measure for avoiding that situation is as follows. The eject button used for removing the storage medium 91 in which the capturing folder 114 is created is arranged to be locked while the power of the digital camera 1 is off. That is, the eject button is arranged to be operable only while the power of the digital camera is on.

With this arrangement, until the user turns on the power of the digital camera 1, the user cannot operate the eject button and therefore cannot remove the storage medium 91. When the eject button (operation unit 12) is operated while the power is on, the decision part 102 can detect the time of the operation of the eject button as the time at which removal of the storage medium 91 is instructed, and the information fabricator part 101 can execute the processing.

Another exemplary measure for avoiding the above situation is described. The arrangement is adopted in which a cover provided on the card slot 18 has to be opened for operating the eject button. In addition, the digital camera 1 is arranged such that the power of the digital camera 1 is always on while the cover is opened.

With this arrangement, before the user operates the eject button, the power of the digital camera 1 is always turned on when the user opens the cover. The decision part 102 can make the decision at a time at which opening of the cover is detected, and the information fabricator part 101 can execute the processing in accordance with the result of the decision.

According to still another exemplary measure, a time at which turning off the power of the digital camera 1 is instructed by the operation of the power switch (operation unit 12) is regarded as the time at which removal of the storage medium 91 is instructed.

With this arrangement, even if an image is newly taken and new image information 80 corresponding thereto is created in the storage medium 91, whenever the power of the digital camera 1 is turned off, the decision part 102 makes the decision and the information fabricator part 101 executes the processing. Therefore, after the power of the digital camera 1 is turned off, all files of the image information 80 are stored in form of the fabricated image information 84 or the image information 85 in the output folder 911 and there is no problem caused if the storage medium 91 is removed by operation of the eject button in that situation.

However, in a case where the capturing folder 114 is created in the storage medium 91, even if all the image information 80 is saved as the fabricated image information 84 or the image information 85 in the output folder 911, leaking of the capturing location information 81 may be caused by wrong operation by the user. For example, there can be a case in which the user tries to copy the image information 80 in the capturing folder 114 by mistake, instead of the fabricated image information 84 or the image information 85 in the output folder 911 (because the image information 80 is not deleted). Therefore, for the storage medium 91 including the capturing folder 114 therein, the following measures can be taken: prohibit copying or transferring information from the capturing folder 114; save the image information 80 in the capturing folder 114 as a hidden file, or create the image information 80 in a format unique to the digital camera 1 (because, if the viewer device 7 cannot display the image information 80, it is possible to prevent the image information 80 from being chosen by mistake), for example.

In the first preferred embodiment of the present invention, when the decision part 102 has once decided that the capturing location information 81 included in the image information 80 should be kept secret in accordance with the decision conditions which will be described later, the decision part 102 regards that decision result as a provisional decision result and notifies the user of the provisional decision result by displaying notification information corresponding to the provisional decision result on the LCD PANEL 13. Also, the decision part 102 acquires instruction information on the user's instruction responding to the displayed notification information from the operation unit 12, and, in accordance with the user's instruction, outputs a final decision result to the information fabricator part 101. In this manner, it is possible to call for the user's attention by the notification information and make final decision in accordance with the user's intention.

Alternatively, the decision part 102 may be arranged to only notify the user with the notification information and output the provisional decision result as the final decision result to the information fabricator part 101 without waiting for input of the instruction information by the user. In this case, the user can find whether or not the fabricating is done from the notification information. Also, it is not necessary for the user to input the instruction information for each image information 80, reducing the burden of the user.

The arrangement and functions of the digital camera 1 are described above. Next, how to store an image by means of the digital camera 1 is described.

Figure 4:
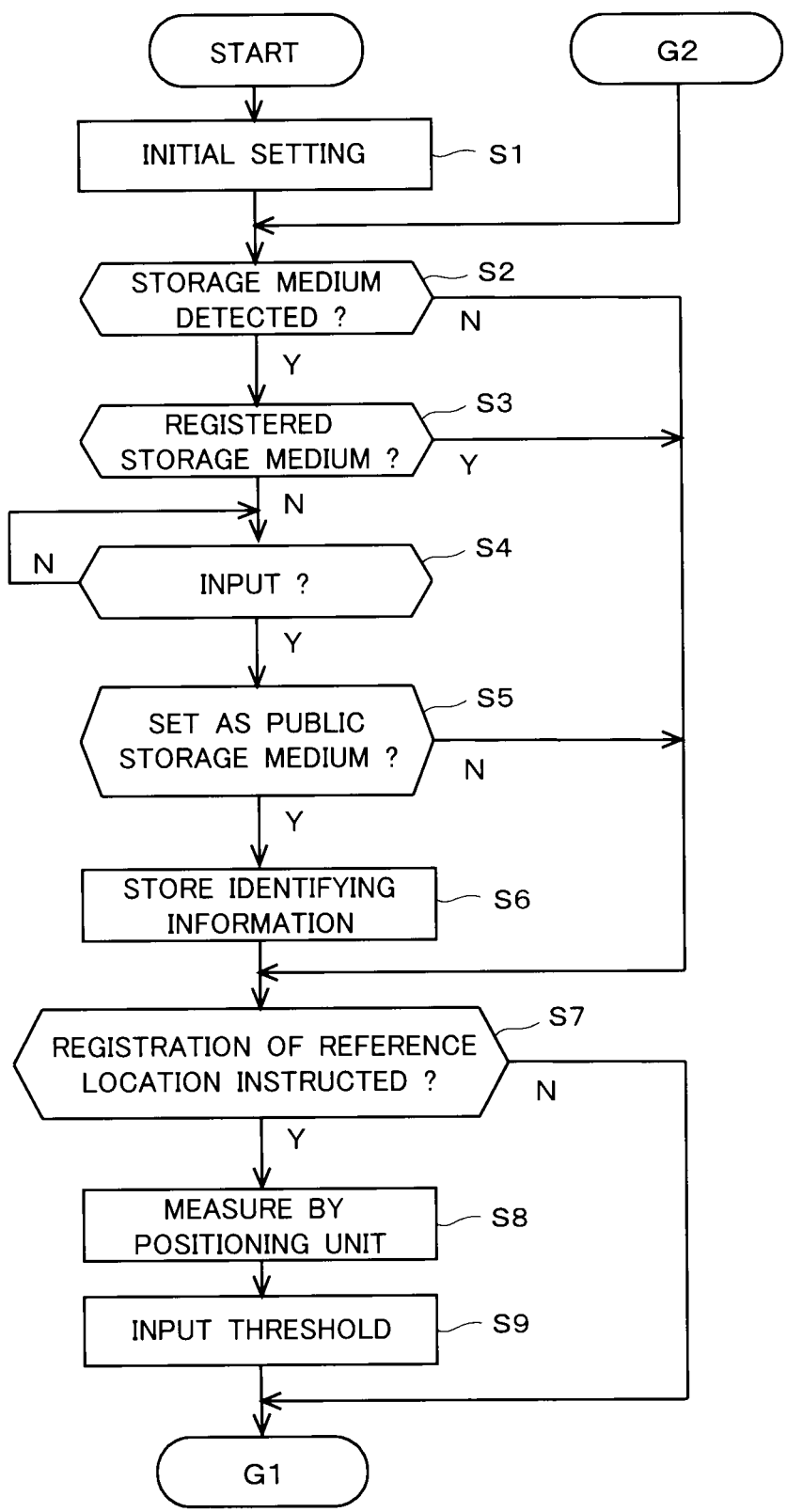
FIGS. 4 and 5 are flow charts of an image storing method in the first preferred embodiment of the present invention, which is implemented in a digital camera according to the first preferred embodiment of the present invention.
Figure 5:
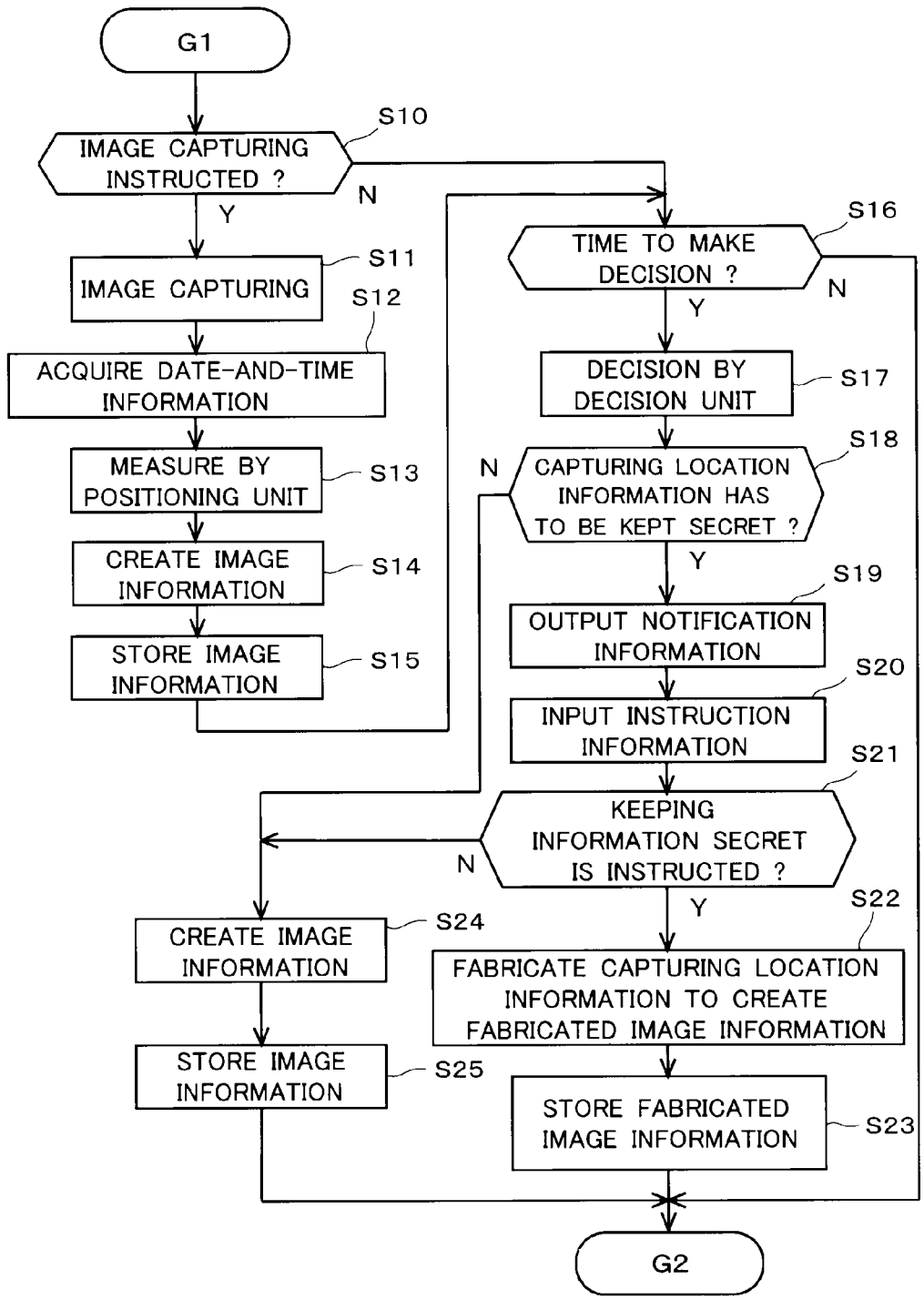

FIGS. 4 and 5 are flowcharts of an image storing method in the first preferred embodiment of the present invention which is implemented by the digital camera 1 according to the first preferred embodiment of the present invention.

When the power of the digital camera 1 is turned on, the CPU 10 carries out a predetermined initial setting operation (Step S1) and goes into a monitoring state for monitoring predetermined states.

In the monitoring state, the CPU 10 monitors insertion of a storage medium 91 into the card slot 18, an instruction to register the reference location, an instruction to capture an image, and a time for decision (Steps S2, S7, S10, and S16).

When a newly inserted storage medium 91 is detected in the monitoring state, the CPU 10 determines "Yes" in Step S2 and then determines whether or not the detected storage medium 91 is registered as a public storage medium 91 (which is used for storing captured-image information 82 to be made open) (Step S3).

In Step S3, the determination is made by checking identifying information 910 stored in the storage medium 91 detected in Step S2 and identifying information 113 stored in the memory 11. If they are coincident with each other, it is determined that the detected storage medium 91 has already been registered. If they are not coincident, the detected storage medium 91 is determined to be unregistered.

In a case where the storage medium 91 detected in Step S2 is determined as a public storage medium 91 which has already been registered, the CPU 10 determines "Yes" in Step S3 and skips Steps S4 to S6 and goes back into the monitoring state.

In a case where the storage medium 91 detected in Step S2 is determined as a non-registered one, the CPU 10 determines "No" in Step S3, displays a message urging the user to input the use of the detected storage medium 91 on the LCD PANEL 13, and waits for the user's input (Step S4).

The user then operates the operation unit 12 in accordance with the message displayed on the LCD PANEL 13 to input the use of the detected storage medium 91 (i.e., whether or not that medium 91 is used for storing data to be made open.)

When the user operates the operation unit 12 to input the use of the detected storage medium 91, the CPU 10 determines "Yes" in Step S4 and then determines whether or not that storage medium 91 is used for storing data to be made public (Step S5).

In a case where the user sets the use of the storage medium 91 detected in Step S2 as "public", the CPU 10 determines "Yes" in Step S5, copies the identifying information 910 stored in that storage medium 91 into the memory 11 as the identifying information 113 (Step S6), and goes back into the monitoring state. That is, the CPU 10 registers the detected storage medium 91 as a public storage medium.

On the other hand, in a case where the user does not set the storage medium 91 detected in Step S2 as "public", the CPU 10 determines "No" in Step S5 and skips Step S6 to go back into the monitoring state.

In the monitoring state, when the user operates the operation unit 12 to input an instruction to register the reference location, the CPU 10 determines "Yes" in Step S7 and controls the positioning unit 15 to measure the location. In response to that, the positioning unit 15 measures the current location (Step S8) and information indicating the current location thus acquired by the positioning unit 15 is stored as reference location information 111 in the memory 11. Thus, the location of the digital camera 1 when Step S8 is executed is set as a new reference location.

In this way, the digital camera 1 can store the information on the location acquired by the positioning unit 15 when the digital camera 1 is located at a user's desired reference location, as the reference location information 111 in the memory 11. Therefore, it is easier to store the reference location information 111, as compared with a case where the reference location is input by key operations.

The user then operates the operation unit 12 to input a threshold (relative distance) at the reference location set in Step S8 (Step S9). The CPU 10 then stores the threshold input in Step S9 as threshold information 112 in the memory 11 and goes back into the monitoring state.

In the monitoring state, when the user operates the operation unit 12 to input an instruction to capture an image, the CPU 10 determines "Yes" in Step S10, controlling the image capturing unit 16 to capture an image, controlling the timing unit 17 to acquire date-and-time information 83, and controlling the positioning unit 15 to measure the location. Thus, the image capturing unit 16 acquires captured-image information 82 by capturing an image of a subject (Step S11), and the timing unit 17 acquires the current date and time (i.e., the date and time at which the image capturing unit 16 captures the image) as date-and-time information 83 (Step S12). Also, the positioning unit 15 measures the current location (i.e., the location at which the image capturing unit 16 captures the image) (Step S13) to acquire capturing location information 81.

The creation part 100 then creates image information 80 based on the capturing location information 81, the captured-image information 82, and the date-and-time information 83 (Step S14) and stores the created image information 80 in the capturing folder 114 (Step S15). After the captured-image information 82 acquired by image capturing (the image information 80) is created and stored, the digital camera 1 goes into the monitoring state again.

In the monitoring state, when the CPU 10 (the decision part 102) detects a time to make decision, the CPU 10 determines "Yes" in Step S16 and the decision part 102 decides whether or not the capturing location information 81 should be kept secret (Step S17). The detailed description of how the decision part 102 detects the time to make decision has already been made and is therefore omitted here. Mainly the decision part 102 detects a time at which the image information 80 is output to the outside as the time to make decision.

Various conditions can be considered to be used in the decision by the decision part 102 in Step S17.

As the first exemplary condition, in accordance with a result of comparison of the capturing location information 81 (indicating the capturing location) included in the image information 80 and the reference location information 111

(the information on the reference location) stored in the memory 11 to each other, the decision part 102 can decide whether or not that capturing location information 81 is to be kept secret.

More specifically, the decision part 102 calculates the relative distance between the capturing location (indicated by the capturing location information 81) and the reference location (indicated by the reference location information 111) and decides that the capturing location information 81 is to be kept secret if the calculated relative distance is equal to or less than the threshold indicated by the threshold information 112. For example, a case is considered in which the location of the user's home is the reference location and the information on the user's home is stored as the reference location information 111 beforehand. If the relative distance from the home is equal to or less than the threshold, the decision part 102 decides that the capturing location information 81 should be kept secret because the location of the home may be identified. In this manner, the decision part 102 can decide whether or not the capturing location information 81 should be kept secret, using the capturing location as the condition.

The second exemplary condition is described. The decision part 102 can decide whether or not the capturing location information 81 included in the image information 80 is to be kept secret in accordance with the date-and-time information 83 the creation part 100 adds to the image information 80. More specifically, if the capturing date and time indicated by the date-and-time information 83 is a predetermined date and time, in a predetermined time zone, or the like, the decision part 102 can decide that the capturing location information 81 should be kept secret. In this manner, the decision part 102 can decide whether or not the capturing location information 81 should be kept secret, using the capturing date and time as the condition. The date and time, the time zone or the like, which is used as the condition may be set by the user in advance and stored in the memory 11.

As the third exemplary condition, the decision part 102 can decide whether or not the capturing location information 81 should be kept secret in accordance with the identifying information 910 stored in the storage medium 91. More specifically, the identifying information 910 and the identifying information 113 are compared to each other. If they are coincident with each other, it is decided that for the image information 80 stored in the capturing folder 114 the capturing location information 81 is to be kept secret. That is, by storing the identifying information 910 of the storage medium 91 which is used for storing image information 80 with capturing location information 81 to be kept secret as the identifying information 113 in the memory 11 in advance, the decision part 102 can decide whether or not the capturing location information 81 should be kept secret depending on the use of every storage medium 91.

The fourth exemplary condition is as follows. When making decision, the decision part 102 can control the positioning unit 15 to acquire information on an output location at which the output is going to be carried out as output location information, and decide whether or not the capturing location information 81 is to be kept secret in accordance with a result of comparison of the output location information on the output location and the reference location information 111 to each other. For example, in a case where it can be considered the output is going to be carried out at home, the decision part 102 decides that the capturing location information 81 need not be kept secret. However, at other locations, the decision part 102 decides that the capturing location information 81 is to be kept secret. The decision results can be reversed. In this way, the decision part 102 can decide whether or not the capturing location information 81 should be kept secret, using the information on the location of the digital camera 1 when the image information 80 is output from the digital camera 1 to the outside, i.e., the output location as the condition for decision.

As the fifth exemplary condition, the decision part 102 can decide whether or not the capturing location information 81 included in the image information 80 is to be kept secret in accordance with whether or not the positioning unit 15 could acquire the output location information on the output location. For example, in a case where the positioning unit 15 could not acquire the output location information on the output location, the decision part 102 considers that the output of the image information 80 is going to be carried out in doors, and decides that the capturing location information is to be kept secret (the decision result can be reversed).

As the sixth exemplary condition, the operation mode of the digital camera 1 can be used. When the operation mode of the digital camera 1 is set in a particular mode (e.g., secret mode), the decision part 102 can decide that the capturing location information 81 should be kept secret.

The above-listed conditions can be considered as the condition to make the decision by the decision part 102 in Step S17, but the condition is not limited to the above. Moreover, all of the above-listed conditions are not always used in the decision. The user can set at least one of the above-listed conditions as setting information in advance and store it in the memory 11. The decision part 102 decides whether or not the capturing location information 81 is to be kept secret in accordance with the thus set condition, thereby allowing the decision to made depending on the situation and reducing the processing as compared with a case where the decision is made for all files of the image information 80.

As for the image information 80 for which keeping the capturing location information 81 secret is decided to be unnecessary in the decision by the decision part 102 in Step S17, it is determined to be "No" in Step S18. The decision part 102 transfers the final decision result that it is unnecessary to keep the capturing location information 81 secret to the information fabricator part 101. In this case, the image information 80 is not subjected to fabricating of the capturing location information 81 by the information fabricator part 101, but the image information 85 is obtained from the image information 80 without change (Step S24). The image information 85 is then stored in the output destination of the image information 80 (i.e., the output folder 911 in the storage medium 91 or the viewer device 7) (Step S25). Then, the digital camera 1 goes into the monitoring state again.

On the other hand, for the image information 80 with the capturing location information 81 which is decided to be kept secret by the decision part 102 in Step S17, the determination result in Step S18 is "Yes". Thus, the decision part 102 controls the LCD PANEL 13 to display notification information describing that the capturing location information 81 should be kept secret in accordance with the result in the decision in Step S17 as the provisional decision result. In this manner, the user can be notified by the notification information on the LCD PANEL 13 (Step S19).

The user who is notified by Step S19 that the capturing location information 81 may leak and therefore is to be kept secret then determines whether or not to actually keep the capturing location information 81 secret, and operates the operation unit 12 to input instruction information indicating the user's determination result (i.e., the instruction information on whether or not keeping the capturing location information 81 secret is instructed) (Step S20).

The decision part 102 then acquires from the operation unit 12 the instruction information input by the user in Step S20. In accordance with the instruction information, the decision part 102 makes the decision whether or not keeping the capturing location information 81 secret is instructed by the user for the image information 80 which is provisionally determined to be kept secret in Step S17 (Step S21).

If keeping the capturing information 81 secret is not instructed by the user, the determination result in Step S21 is "No" and the decision part 102 transfers the final decision result that keeping the capturing location information 81 of that image information 80 secret is not necessary to the information fabricator part 101. Then, steps S24 and S25 are executed.

On the other hand, in a case where keeping the capturing location information 81 secret is instructed by the user, the determination result is "Yes" in Step S21, and the decision part 102 transfers the final decision result that the capturing location information 81 of that image information 80 is to be kept secret to the information fabricator part 101. Thus, the information fabricator part 101 reads that image information 80 from the capturing folder 114 and fabricates the capturing location information 81 added to that image information 80 to acquire fabricated image information 84 (Step S22).

As described above, as for the image information 80 for which it is decided that the capturing location information 81 is to be kept secret, the information fabricator part 101 in the first preferred embodiment deletes the capturing location information 81 to create the fabricated image information 84.

The fabricated image information 84 thus created is stored in the output destination of the image information 80 (Step S23), and the digital camera 1 goes into the monitoring state again. More specifically, the digital camera 1 carries out all of Steps S17 to S25 for all files of the image information 80 and thereafter goes back into the monitoring state.

As described above, a digital camera 1 in the first preferred embodiment of the present invention is an imaging device which can capture an image of a subject to acquire captured-image information 82. The imaging device comprises: a positioning unit 15 arranged to measure a location at which the image is captured, to acquire capturing location information 81 indicating a capturing location when the captured-image information 82 is acquired; a creation part 100 arranged to create image information 80 based on the capturing location information 81 acquired by the positioning unit 15 and the captured-image information; a memory 11 arranged to store the image information 80 created by the creation part 100; a decision part 102 arranged to, when the image information 80 stored in the memory 11 is output to the outside, decide whether or not the capturing location information 81 included in the image information 80 is to be kept secret; and a fabricator part 101 arranged to fabricate the capturing location information 81 included in the image information 80 in accordance with a result of the decision by the decision part 102. Thus, the imaging device in the first preferred embodiment of the present invention can more effectively prevent leaking of the information, as compared with a conventional technique which decides at the time of image capturing whether or not the capturing location information is to be kept secret.

The memory 11 stores reference location information 111. In accordance with a result of comparison of the capturing location information 81 included in the image information 80 created by the creation part 100 and the reference location information 111 stored in the memory 11 to each other, the decision part 102 decides whether or not that capturing location information 81 is to be kept secret. Thus, it is possible to decide whether or not to keep the location information 81 secret depending on the situation, and the processing can be reduced as compared with a case where that decision is made for every file of the image information 80.

Moreover, location information which is acquired by the positioning unit 15 when the digital camera 1 is located at a reference location is stored as the reference location information 111 on the reference location in the memory 11. Thus, it is possible to easily store the reference location information on the reference location.

The imaging device in the first preferred embodiment of the present invention further includes a timing unit 17 arranged to acquire date-and-time information 83 indicating the date and time at which the captured-image information 82 is acquired. When creating the image information 80 based on the captured-image information 82, the creation part 100 adds the date-and-time information 83 acquired by the timing unit 17 to that image information 80. The decision part 102 decides whether or not the capturing location information 81 included in that image information 80 is to be kept secret in accordance with the date-and-time information 83 added to that image information 80 by the creation part 100. In this way, it is possible to decide whether or not to keep the location information 81 on the capturing location secret, depending on the capturing date and time. This enables the decision to be made depending on the situation, and can reduce the processing as compared with a case where the decision is made for every file of the image information 80.

Moreover, the storage medium 91 can store identifying information 113 for identifying that storage medium 91. The decision part 102 can decide whether or not the location information 81 included in the image information 80 is to be kept secret in accordance with the identifying information 113 stored in the storage medium 91. Thus, it is possible to decide whether or not to keep the capturing location information 81 secret depending on the use of the storage medium 91, for example. Therefore, it is possible to decide whether or not to keep the capturing location information 81 secret depending on the situation and to reduce the processing as compared with a case where the above decision is made for every file of the image information.

The decision part 102 can decide whether or not to keep the capturing location information 81 secret, regarding a time at which removal of the storage medium 91 is instructed as a time of output of the image information 80 stored in the memory 11 to the outside. When removal of the storage medium 91 is instructed, it is highly likely that the image information 80 stored in the removed storage medium 91 is output to the outside (or taken out). Therefore, this arrangement enables the decision whether or not to keep the capturing location information 81 secret to be made at a more appropriate time.

It can be decided whether or not the capturing location information 81 is to be kept secret, depending on information on the output location at which the image information 80 is output from the imaging device to the outside, i.e., output location information. Thus, it is possible to decide whether or not to keep the capturing information 81 secret depending on the situation, and to reduce the processing as compared with a case where that decision is made for every file of the image information.

The digital camera 1 can further include a communication unit 19 arranged to carry out data communication with an external device such as a viewer device 7. The decision part 102 can determine a time at which the digital camera 1 is connected to the external device via the communication unit 19 in a communicable manner as a time at which the image information 80 stored in the memory 11 is output to the outside, and decides whether or not to keep the capturing location information 81 secret. It is highly likely that, when any communication line is connected, the image information 80 is output to the outside. Therefore, this arrangement enables the decision whether or not to keep the capturing location information 81 secret to be made at a more appropriate time.

The digital camera 1 can further include an LCD PANEL 13 arranged to output notification information in accordance with the result of decision by the decision part 102 as a provisional decision result and an operation unit 12 arranged to receive instruction information on the user's instruction responding to the notification information output by the LCD PANEL 13. The decision part 102 can modify the provisional decision result into a final decision result in accordance with the instruction information. Thus, it is possible to alert the user with the notification information, and the final decision whether or not to keep the capturing location information 81 secret can be made in accordance with the user's intension.

The fabricating by the information fabricator part 101 can include deletion of the capturing location information 81 included in the image information 80. Thus, leaking of the capturing location information 81 can be surely prevented.

Moreover, the fabricating by the information fabricator part 101 can include replacement of the capturing location information 81 indicating the capturing location with pseudo information. Thus, leaking of the capturing location information 81 can be surely prevented.

The first preferred embodiment is described assuming that the capturing location information 81 is added to every file of the captured-image information 82 at the capturing time. However, the digital camera 1 may be arranged to decide whether or not the capturing location information 81 is to be kept secret at the capturing time.

Figure 6:
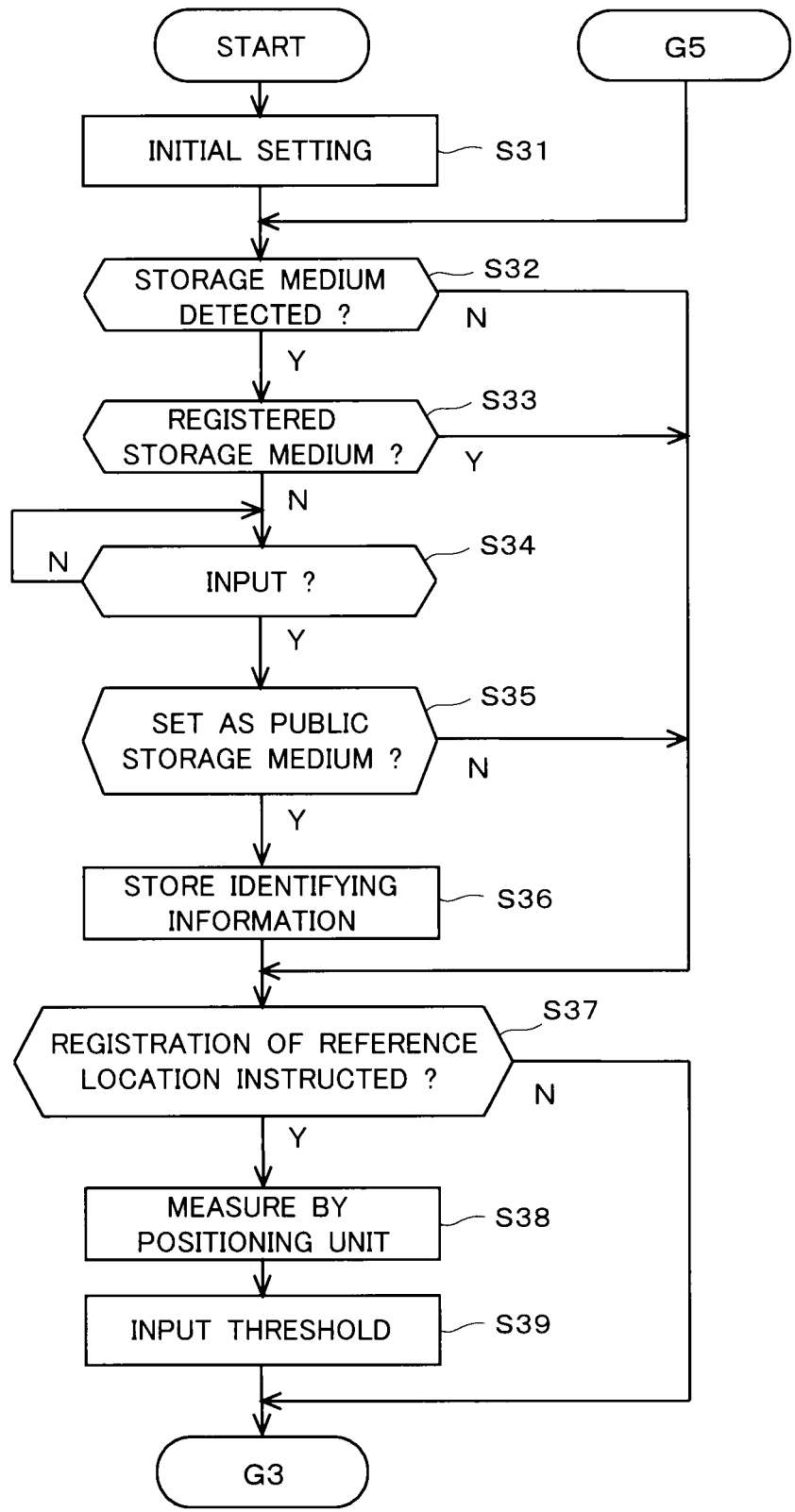
FIGS. 6, 7 and 8 are flow charts of an image storing method in the second preferred embodiment of the present invention, which is implemented in a digital camera according to the second preferred embodiment of the present invention.
Figure 7:
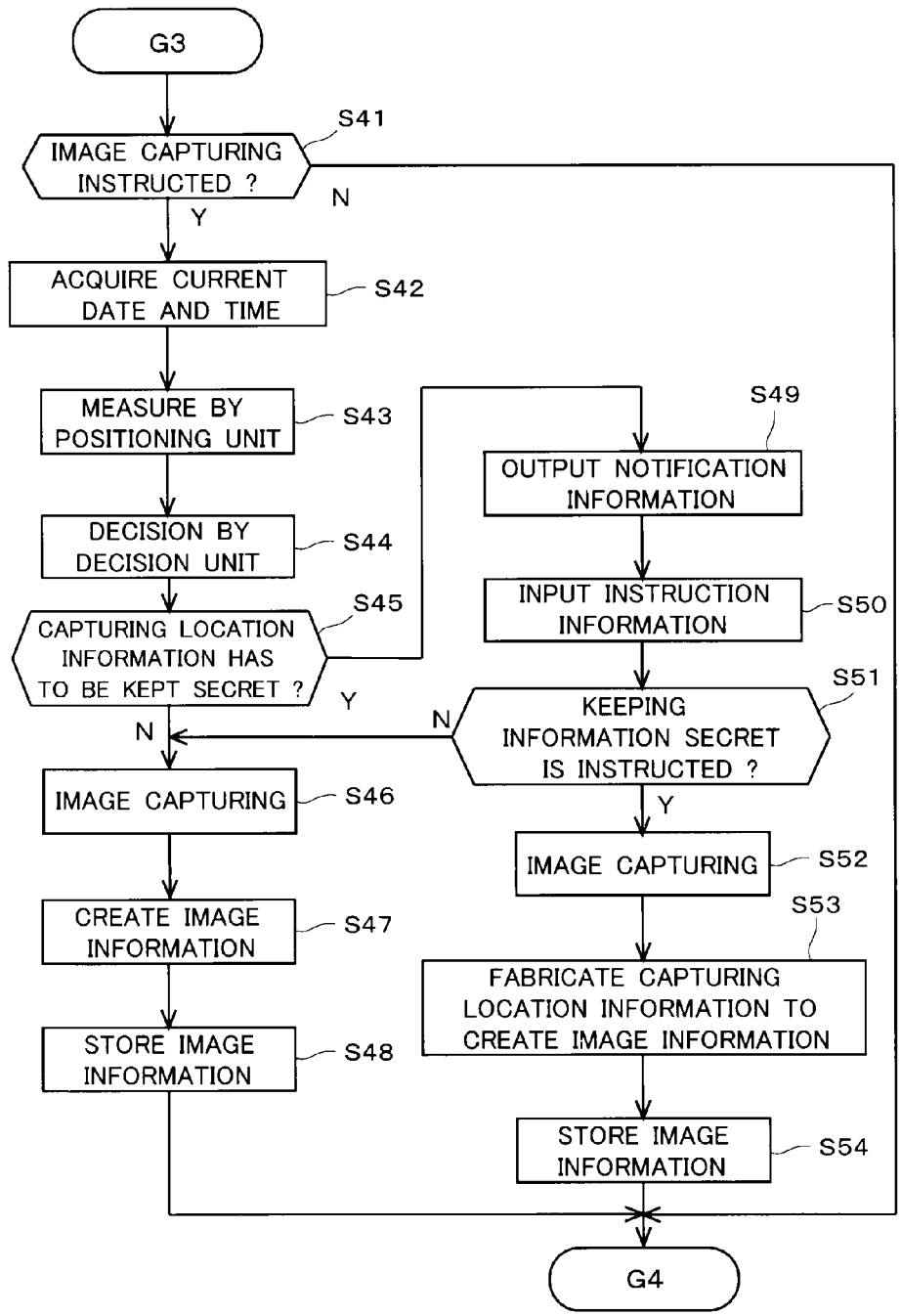
Figure 8:
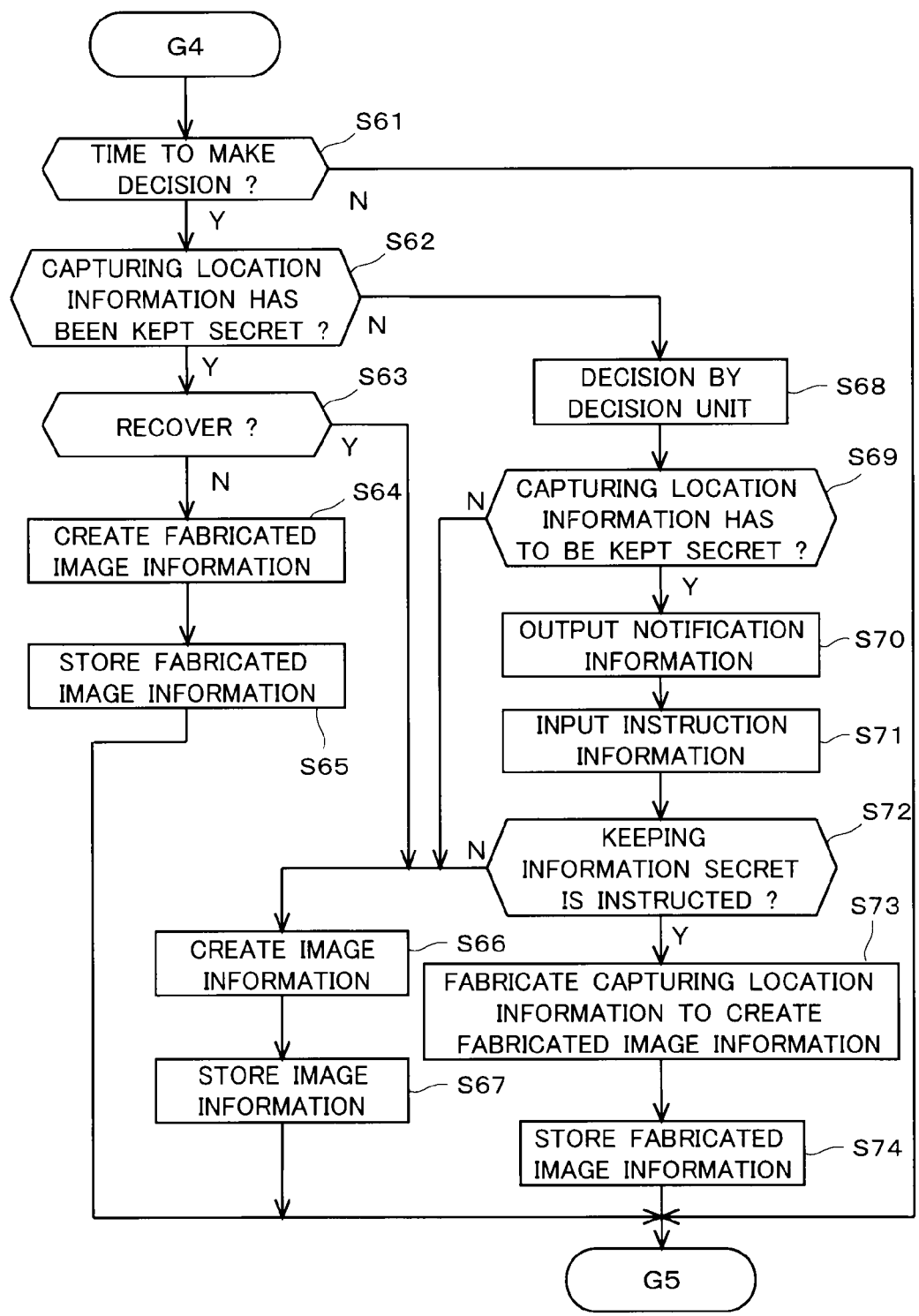

FIGS. 6 to 8 show an image storing method in the second preferred embodiment of the present invention, which is implemented by a digital camera 1 according to the second preferred embodiment of the present invention. The digital camera 1 of the second preferred embodiment has the same arrangement as that of the first preferred embodiment. Therefore, like functions and components of the digital camera 1 of the second preferred embodiment are labeled with like reference numerals as those in the first preferred embodiment, and the description thereof is appropriately omitted.

When the power of the digital camera 1 of the second preferred embodiment is turned on, the CPU 10 executes a predetermined initial setting operation (Step S31) and goes into a monitoring state in which the CPU 10 monitors predetermined states, as in the first preferred embodiment.

In the monitoring state, the CPU 10 monitors insertion of a storage medium 91 into the card slot 18, an instruction to register a reference location, a capturing instruction, and a time to make decision (Steps S32, S37, S41, and S61).

The processes in Steps S32 to S39 in the second preferred embodiment are the same as those in Steps S2 to S9 in the first preferred embodiment and therefore the description thereof is omitted.

In the monitoring state, when the user operates the operation unit 12 to input the capturing instruction, the digital camera 1 determines "Yes" in Step S41. The CPU 10 controls the timing unit 17 to acquire the current date and time and also controls the positioning unit 15 to measure the current location. In this manner, the current date and time is acquired by the timing unit 17 (Step S42) and location information on the current location is acquired by the positioning unit 15 (Step S43).

The decision part 102 of the second preferred embodiment then decides whether or not to keep capturing location information 81 indicating the capturing location secret based on the condition for decision (Step S44). Then, in accordance with the result of that decision, the decision part 102 decides whether or not keeping the capturing location information 81 secret is necessary (Step S45). The same condition as those for Step S17 in the first preferred embodiment can be used in the decision in the second preferred embodiment.

In a case where keeping the capturing location information 81 secret is determined to be unnecessary ("No" in Step S45), the CPU 10 controls the image capturing unit 16 to capture an image. Thus, the image capturing unit 16 captures an image of a subject (Step S46) to acquire captured-image information 82.

The creation part 100 then creates image information 80, using the current date and time acquired in Step S42 as date-and-time information 83 indicating the capturing date and time, the current location acquired in Step S43 as the capturing location information indicating the capturing location, and the captured-image information 82 acquired in Step S46 (Step S47).

When Step S47 is executed, it is unnecessary to fabricate the capturing location information 81 indicating the capturing location. Therefore, the location information acquired by the positioning unit 15 is added without change to the image information 80 as the capturing location information 81. The capturing location information 81 and the date-and-time information 83 may be newly acquired immediately after Step S46 is executed.

After creating the image information 80 by executing Step S47, the creation part 100 stores the created image information 80 in the capturing folder 114 (Step S48). When Steps S47 and S48 are executed, it has already been decided that keeping the capturing location information 81 secret is not necessary. Therefore, the creation part 100 may be arranged to create image information 85 in Step S47 and store the image information 85 in the output folder 911 in Step S48. However, in order to prevent the capturing location information 81 from being leaked by mistake, it is preferable to decide again whether or not to keep the capturing location information 81 secret when the captured-image information 82 is output to the outside. Thus, especially for the captured-image information 82 with the capturing location information 81 which is left unfabricated, it is preferable to store that captured-image information 82 in the capturing folder 114 at the capturing time.

In a case where the capturing location information 81 is decided to be kept secret in Step S45 ("Yes" in Step S45), the decision part 102 displays notification information notifying that decision result on the LCD PANEL 13 in accordance with that decision result as a provisional decision result. In this manner, the LCD PANEL 13 can alert to the user (Step S49).

The user, who is notified by Step S49 that the capturing location information 81 may be leaked and is to be kept secret, determines whether or not to actually keep the capturing location information 81 secret and operates the operation unit 12 to input instruction information indicating the result of the user's determination (i.e., information indicating whether or not keeping the capturing location information 81 secret is instructed) (Step S50).

The decision part 102 acquires from the operation unit 12 the instruction information input by the user in Step S50, and decides whether or not keeping the capturing location information 81 secret is instructed by the user in accordance with the instruction information (Step S51).

If keeping the capturing location information 81 secret is not instructed, the decision part 102 determines "No" in Step S51 and the digital camera 1 executes Steps S46 to S48.

If keeping the capturing location information 81 secret is instructed, the decision part 102 determines "Yes" in Step S51 and the CPU 10 controls the image capturing unit 16 to carry out a capturing operation instructed by the user. Thus, the image capturing unit 16 captures an image of a subject (Step S52) to acquire captured-image information 82.

After the captured-image information 82 is acquired in Step S52, the creation part 100 in the second preferred embodiment transfers the information on the current location acquired in Step S43 as the capturing location information 81 indicating the capturing location to the information fabricator part 101. The information fabricator part 101 then fabricates that capturing location information 81 and transfers it to the creation part 100. The creation part 100 creates image information 80 based on the current date and time (date-and-time information 83) acquired in Step S42, the captured-image information 82 acquired in Step S46, and the capturing location information 81 fabricated by the information fabricator part 101 (Step S53).

In Step S53, the creation part 100 may create the image information 80 without adding the capturing location information 81 thereto. Moreover, the fabricating of the capturing location information 81 in Step S53 may be replacement it with dummy data. However, considering a case where the keeping the capturing location information 81 secret might become unnecessary when that image information 80 is output to the outside later, the fabricating of the capturing location information 81 may be preferably moving of the capturing location information 81 to another place in a file, encryption, or the like for allowing easy recovery of the capturing location information 81. Moreover, the capturing location information and the date-and-time information 83 may be newly acquired immediately after Step S52 is executed.

The creation part 100 stores the image information 80 created by executing Step S53 in the capturing folder 114 (Step S54).

When Steps S53 and S54 are executed, it has already been decided that the capturing location information 81 is to be kept secret. Therefore, the digital camera 1 may be arranged to create the fabricated image information 84 in Step S53 and store the fabricated image information 84 thus created in the output folder 911 in Step S54. However, the user's intention may be changed between at the capturing time and at the output time. Thus, for deciding whether or not to keep the location information 81 secret when the captured-image information 82 is output to the outside, it is preferable to create the image information 80 and store it in the capturing folder 114.

After executing Step S48 or S54, the digital camera 1 in the second preferred embodiment goes into the monitoring state again.

In the monitoring state, when the time to make decision is detected, the decision part 102 determines "Yes" in Step S61 (Step S61). How to determine that the time to make decision has been detected can be the same as that in Step S16 in the first preferred embodiment.

When it is determined "Yes" in Step S61, the decision part 102 analyzes the capturing location information 81 of the image information 80, thereby determining whether or not the capturing location information 81 has already been kept secret. That is, it is determined whether or not that capturing location information 81 is created in Step S53.

In a case where the capturing location information 81 is fabricated or no capturing location information 81 is added, the decision part 102 determines "Yes" in Step S62 and further determines whether or not to recover the capturing location information 81 (Step S63). The determination in Step S63 is made in accordance with instruction information the user inputs by operating the operation unit 12.

In the digital camera 1 in the second preferred embodiment, the capturing location information 81 is fabricated in Step S53 such that it can be recovered later. However, if the capturing location information 81 cannot be recovered (e.g., if no capturing location information 81 is added), it is determined to be "No" in Step S63 without waiting for input of the instruction information by the user.

When it is determined to be "No" in Step S63, the information fabricator part 101 creates fabricated image information 84, using the image information 80 with the capturing location information 81 which has already been kept secret as it is (Step S64), and stores that fabricated image information 84 in a specified output destination (the output folder 911 or the external device such as the viewer device 7) (Step S65). The digital camera 1 may be arranged to create the fabricated image information 84 by changing the fabricating method of the capturing location information 81, or the like, even in a case where it is determined that recovery is not necessary in Step S63.

If it is determined to be "Yes" in Step S63, the capturing location information 81 of the image information 80 is recovered, thereby creating image information 85 (Step S66). The image information 85 is stored in the specified output destination (the output folder 911 or the external device such as the viewer device 7) (Step S67).

In a case where the capturing location information 81 is encrypted, the recovery of it in Step S66 is carried out by decrypting and adding it. In a case where the storage place of the capturing location information 81 in the file has been changed, the capturing location information 81 is recovered by being moved back to a predetermined storage place. Moreover, in a case where the capturing location information 81 is moved and stored in another region in the memory 11, the capturing location information 81 is acquired from that region and added.

On the other hand, if the determination result is "No" in Step S62 (the capturing location information 81 without being fabricated is included in the image information 80), the decision part 102 makes the decision in accordance with the condition for decision (Step S68). The processes in Steps S68 to S74 in the second preferred embodiment can be carried out in the same manner as those in Steps S17 to S25 in the first preferred embodiment, and therefore the description thereof is omitted.

As described above, the digital camera 1 in the second preferred embodiment is an imaging device which can capture an image of a subject to acquire captured-image information 82. The digital camera 1 comprises: a positioning unit 15 arranged to measure a location at which the image is captured, to acquire capturing location information indicating a capturing location when the captured-image information 82 is acquired; a memory 11 arranged to store reference location information 111 on a reference location; a decision part 102 arranged to, when the image is captured, decide whether or not the capturing location information 81 acquired by the positioning unit 15 is to be kept secret in accordance with a result of comparison of the capturing location information 81 and the reference location information 111 stored in the memory 11 to each other; and a creation part 100 arranged to create image information 80 based on a result of the decision by the decision part 102 and the captured-image information 82. With this arrangement, the digital camera 1 in the second preferred embodiment can obtain the same effects as those obtained by the digital camera 1 in the first preferred embodiment. Moreover, it is possible to decide how to process the capturing location information 81, depending on the capturing location. Therefore, it is possible to decide whether or not to keep the capturing location information 81 secret depending on the situation, and reduce the process as compared with a case where that decision is made for every file of image information.

The digital camera 1 in the second preferred embodiment decides whether or not to keep the capturing location information 81 secret when an image of the subject is captured. Therefore, it takes some time to actually capture an image of the subject (Step S46 or S52) after the capturing is instructed (i.e., after it is determined to be "Yes" in Step S41). Especially in a case where Steps S49 and S50 are executed, the capturing operation is delayed.

In other words, the user operates a shutter button (e.g., presses it halfway or completely), but the capturing operation is not carried out. In some cases, the user is requested to input the instruction information. This may cause photo opportunity to be missed, come across as troublesome, and be a problem for the user from a viewpoint of user-friendliness.

There can be various ways to avoid the above problem. Three exemplary measures are described here. In accordance with the first measure, the digital camera 1 can be arranged to, even if the decision part 102 has decided that the capturing location information 81 should be kept secret (the determination result is "Yes" in Step S45), skip Steps S49, S50, and S51 and immediately carry out the capturing operation (Step S52). In other words, at the time of image capturing, only the decision by the decision part 102 which can be made relatively fast is carried out, but confirmation of the user's intention is omitted. Even with this arrangement, when the image information 80 is output from the digital camera 1, Step S63 or S72 is carried out for that image information 80 to give the opportunity that the user's intention is reflected.

In accordance with the second measure, the digital camera 1 can be arranged to, upon receiving the capturing instruction, sequentially execute the processes from the image capturing to storing the image information 80 (from Steps S11 to S15) in the same manner as that in the first preferred embodiment and, immediately after that, execute the same processes as those in Steps S62 to S74 (please note that the image information 80 is created and stored, instead of the fabricated image information 84 or the image information 85). In other words, immediately after the image information 80 is stored after the image capturing, the decision part 102 decides whether or not to keep the capturing location information 81 secret without waiting for output of the image information to the outside. Thus, it is possible to obtain substantially the same effects as those obtained in a case where the decision is made at the time of capturing, without delaying the image capturing.

In accordance with the third measure, the digital camera 1 can be arranged to partially omit the decision by the decision part 102, instead of making the decision every time the capturing operation is instructed. More specifically, in a case of the decision based on the capturing date and time, the decision is made every time a predetermined time has lapsed. During a time period in which the decision is not made, the process is carried out in accordance with the last user's intention. In a case of the decision based on the capturing location, the process is carried out in accordance with the first user's intention while the user with the digital camera 1 is in a predetermined area. In a case of the decision based on the use of the storage medium 91, the process is carried out in accordance with the first user's intention until the storage medium 91 is exchanged, for example.

In the above preferred embodiments, the candidates for the reference location are not limited to the location of the home, but may be set to the location of the school or office, for example, at the user's desire.

The number of the reference locations is not limited to one. That is, a plurality of reference locations may be stored as the reference location information 111. In this case, the threshold information 112 maybe set for each reference location or the threshold information 112 commonly set for two or more reference locations may be used in the decision.

An example is described in the above preferred embodiments in which the capturing location information 81 is decided to be kept secret when the relative distance is equal to or less than the threshold. However, the similar effects can be also obtained in a case in which it is decided that the capturing location information 81 need not be kept secret when the relative distance is equal to or more than the threshold.

The time to make decision by the decision part 102 is not limited to the examples described in the above preferred embodiments, but may be a time at which the digital camera 1 is activated, a time at which reproduction of the image information 80 is instructed in the digital camera 1, or the like.

The information to be fabricated is not limited to the capturing location information 81. For example, the captured-image information 82 or the date-and-time information 83 may be fabricated by the information fabricator part 101, from a viewpoint of preventing leaking of private information. For example, the face of the individual in the captured-image information 82 may be blurred out, or the date-and-time information 83 may be deleted.

In the above preferred embodiments, the digital camera 1 is described as an example of the imaging device. However, the imaging device may be a mobile phone with a digital camera function.

The functional blocks are described as being implemented by software in the above preferred embodiments. However, at least a part or all of those functional blocks may be implemented by dedicated logic circuitry (hardware).

The processes described in the above preferred embodiments are merely examples, but the contents and order are not limited to those in the above preferred embodiments. That is, the contents and order, and the like of the processes may be appropriately changed, as long as the same effects can be obtained.

While the invention has been shown and described in detail, the foregoing description is in all aspects illustrative and not restrictive. It is therefore understood that numerous modifications and variations can be devised without departing from the scope of the invention. The scope of the present invention is shown by claims.

What is claimed is:

1. An imaging device for capturing an image of a subject to acquire captured-image information, comprising:
   positioning circuitry that measures a location at which the image is captured to acquire capturing location information indicating a capturing location where the image is captured;
   creation circuitry that creates image information including the capturing location information acquired by the positioning circuitry and the captured-image information;
   memory that stores the image information created by the creation circuitry;

decision circuitry that decides, when the image information stored in the memory is to be output to outside the imaging device, whether or not the capturing location information included in the image information is to be kept secret; and fabrication circuitry that fabricates the capturing location information included in the image information in accordance with a result of a decision by the decision circuitry, wherein the fabrication circuitry fabricates the capturing location information included in the image information in accordance with the result of the decision by the decision circuitry indicating that the capturing location information included in the image information is to be kept secret to create fabricated image information, the fabricated image information being a variation of the image information stored in the memory.

2. An imaging device according to claim 1, wherein
the memory stores reference location information regarding a reference location, and
the decision circuitry, based on a result of comparing the capturing location information included in the image information created by the creation element to the reference location information stored in the memory, decides whether or not to keep the capturing location information secret.

3. An imaging device according to claim 2, wherein the decision circuitry compares the capturing location information acquired by the positioning circuitry to the reference location information stored in the memory to calculate a relative distance between the capturing location and the reference location.

4. An imaging device according to claim 3, wherein
the memory stores threshold information indicating a predetermined threshold, and
the decision circuitry decides whether or not the capturing location information acquired by the positioning circuitry is to be kept secret based on whether the relative distance is equal to or less than the predetermined threshold indicated by the threshold information stored in the memory.

5. An imaging device according to claim 2, wherein the memory stores information acquired by the positioning circuitry when the imaging device is at the reference location as the reference location information.

6. An imaging device according to claim 1, further comprising:
timing circuitry that acquires date-and-time information indicating a date and time at which the captured-image information is acquired, wherein
the creation circuitry adds the date-and-time information acquired by the timing circuitry to the image information when creating the image information, and
the decision circuitry decides whether or not the capturing location information included in the image information is to be kept secret based on the date-and-time information added to the image information by the creation circuitry.

7. An imaging device according to claim 1, wherein
the memory includes a portable storage medium which is attachable to and removable from a body of the imaging device,
the portable storage medium stores identifying information for identifying the portable storage medium, and
the decision circuitry decides whether or not the capturing location information included in the image information is to be kept secret based on the identifying information stored in the portable storage medium.

8. An imaging device according to claim 7, wherein the decision circuitry decides whether or not to keep the capturing location information secret based on a time at which removal of the portable storage medium is instructed as a time at which the image information stored in the memory is to be output to the outside of the imaging device.

9. An imaging device according to claim 2, wherein
the positioning circuitry acquires output location information regarding an output location at which the image information created by the creation circuitry is output to the outside of imaging device, and
the decision circuitry, based on a result of a comparison of the output location information acquired by the positioning circuitry and the reference location information stored in the memory, decides whether or not the capturing location information included in the image information is to be kept secret.

10. An imaging device according to claim 9, wherein the decision circuitry decides whether or not the capturing location information included in the image information is to be kept secret based on whether or not the positioning circuitry is able to acquire the capturing location information.

11. An imaging device according to claim 1, further comprising:
communication circuitry that carries out data communication with an external device,
wherein the decision circuitry determines a time at which the communication circuitry connects the imaging device to the external device in a communicable manner as a time at which the image information stored in the memory is to be output to the outside of the imaging device, and decides whether or not to keep the capturing location information secret.

12. An imaging device according to claim 1, further comprising:
output circuitry that outputs notification information based on the result of the decision by the decision circuitry as a provisional decision result; and
operation circuitry that receives instruction information regarding a user's instruction responding to the notification information output by the output circuitry,
wherein the decision circuitry modifies the provisional decision result as a result of final decision based on the instruction information.

13. An imaging device according to claim 1, wherein fabricating by the fabricator circuitry includes deletion of the capturing location information from the image information.

14. An imaging device according to claim 1, wherein fabricating by the fabricator circuitry includes replacement of the capturing location information with pseudo information.

15. An imaging device according to claim 1, further comprising direction capturing circuitry that captures a capturing direction associated with the captured image,
wherein the image information created by the creation circuitry includes information regarding the captured direction associated with the captured image, and
wherein the output of the image information stored in the memory to the outside of the imaging device is to a non-volatile storage medium removably coupled to the imaging device via a card slot.

16. An image storing method comprising:
capturing an image of a subject with an imaging device to acquire captured-image information;
acquiring capturing location information indicating a capturing location at which the image is captured;

creating image information including the acquired capturing location information and the captured-image information;

storing the created image information in memory of the imaging device;

deciding, when the image information stored in the memory is to be output from the imaging device to outside the imaging device, whether or not the capturing location information included in the image information is to be kept secret;

fabricating the capturing location information included in the image information in accordance with said deciding; and storing the image information thus fabricated, wherein said fabricating the capturing location information included in the image information in accordance with said deciding is based on said deciding indicating that the capturing location information included in the image information is to be kept secret and is to create fabricated image information, the fabricated image information being a variation of the image information stored in the memory.

17. An image storing method according to claim 16, wherein said deciding whether or not the capturing location information included in the image information is to be kept secret is based on a date and time of said capturing the image.

18. A non-transitory computer-readable storage medium storing computer-readable instructions that, when executed by a computer, cause the computer to perform a method comprising:

capturing an image of a subject to acquire captured-image information;

measuring a location at which the image is captured to acquire capturing location information indicating a capturing location where the image is captured;

creating image information including the acquired capturing location information and the captured-image information;

storing the image information created by the creation element in memory;

deciding, when the image information stored in the memory is to be output to outside an imaging device, whether or not the capturing location information included in the image information is to be kept secret; and fabricating the capturing location information included in the image information in accordance with a result of a decision by said deciding, wherein said fabricating the capturing location information included in the image information in accordance with said deciding is based on said deciding indicating that the capturing location information included in the image information is to be kept secret and is to create fabricated image information, the fabricated image information being a variation of the image information stored in the memory.

19. A non-transitory computer-readable storage medium according to claim 18, wherein said deciding whether or not the capturing location information included in the image information is to be kept secret is based on a date and time of said capturing the image.

* * * * *